United States Patent [19]

Sukup

[11] 3,937,308

[45] Feb. 10, 1976

[54] CABLE TAKE UP FOR TRAVERSING MECHANISMS

[76] Inventor: Eugene G. Sukup, Dougherty, Iowa 50433

[22] Filed: Feb. 23, 1973

[21] Appl. No.: 335,376

[52] U.S. Cl.......... 191/12.2 R; 242/86.5 R; 259/111

[51] Int. Cl.$^{2}$ .......................................... H02G 11/00

[58] Field of Search ........... 254/166, 147, 174, 179, 254/175.5, 175.6, 175.7, 149, 173; 242/86.5 R; 259/100, 101, 112, 113, 114, 111; 191/12 R, 12.2 R, 12.4 R, 12 A; 212/87, 117, 27, 20, 131

[56] References Cited

UNITED STATES PATENTS

| | | | |
|---|---|---|---|
| 1,411,584 | 4/1922 | Peters | 191/12 R |
| 1,622,280 | 3/1927 | Fasting | 259/114 |
| 2,161,818 | 6/1939 | Joy | 191/12.2 A |
| 2,177,941 | 10/1939 | Knudson et al. | 212/27 |
| 2,720,560 | 10/1955 | Funk | 191/12.2 R |
| 3,086,754 | 4/1963 | Niederer | 254/175.5 |
| 3,502,301 | 3/1970 | Davis et al. | 254/147 |
| 3,584,842 | 6/1971 | Sukup | 259/102 |
| 3,695,377 | 10/1972 | Ito et al. | 191/12 R |
| 3,770,914 | 11/1973 | Larsen | 191/12.2 A |

FOREIGN PATENTS OR APPLICATIONS

| | | | |
|---|---|---|---|
| 635,402 | 4/1950 | United Kingdom | 191/12 R |

*Primary Examiner*—Robert J. Spar
*Assistant Examiner*—Kenneth Noland
*Attorney, Agent, or Firm*—Neuman, Williams, Anderson & Olson

[57] ABSTRACT

A motorized traversing power unit includes a take-up reel, with a power supply cable which is anchored at one end adjacent one end of the path of the power unit and is wrapped in one direction around the reel, and a drive cable anchored at one end adjacent the opposite end of the path of the power unit and passing around the take-up reel in an opposite direction. Upon movement of the power unit in either direction, the paying out of one of these cables from the reel causes rotation of the reel for automatic take up of the other cable.

4 Claims, 4 Drawing Figures

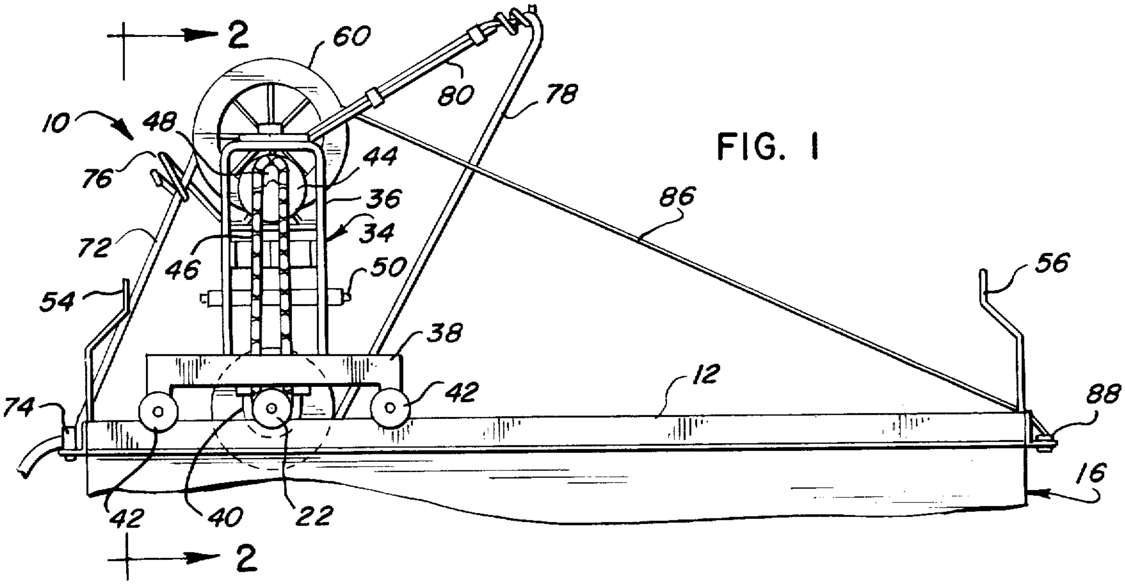
FIG. 1
FIG. 3
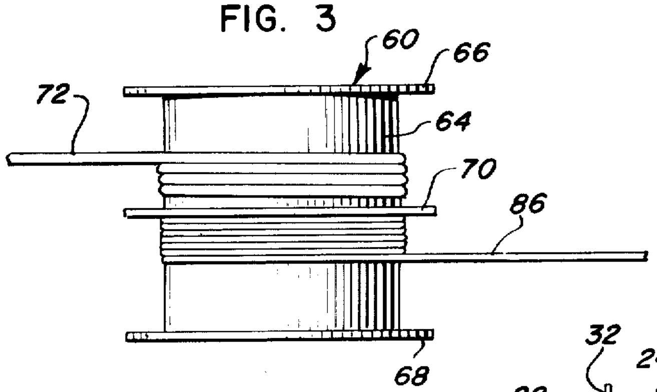
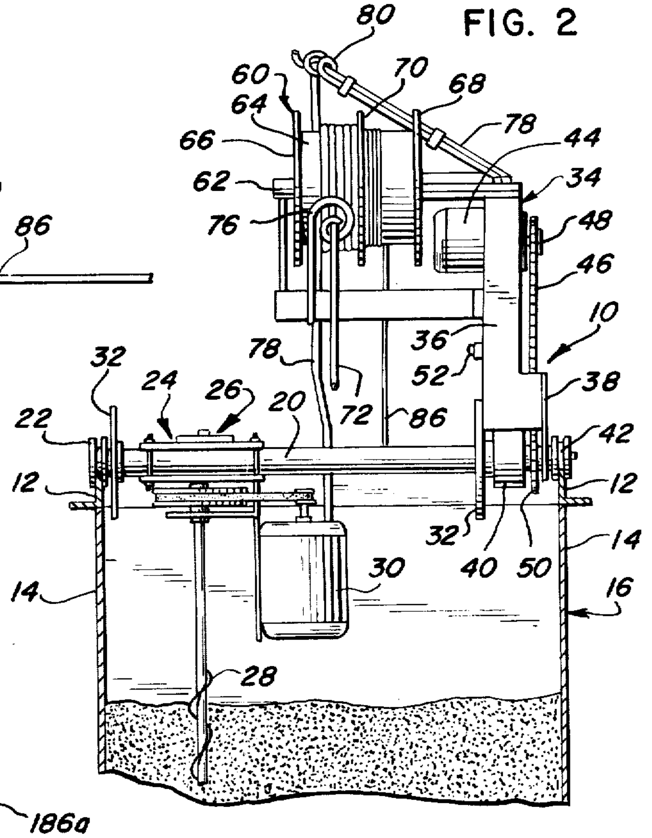
FIG. 2
FIG. 4
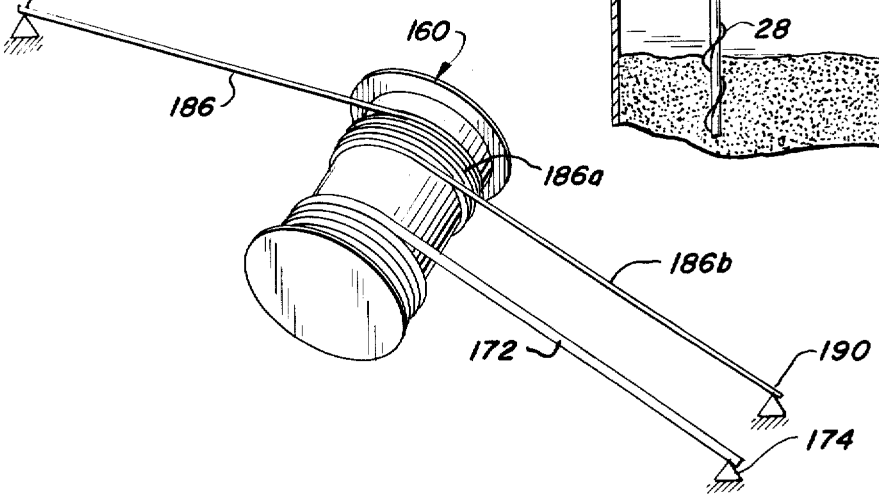

CABLE TAKE UP FOR TRAVERSING MECHANISMS

This invention relates to traversing mechanisms, and more particularly to a take-up arrangement for automatically taking up the slack in a power cable leading to a traversing unit.

Mechanisms of the type to which this invention pertains typically include a frame or vehicle carriage which traverses a work area, with an electric motor on the traversing carriage to supply power for forming an intended task within the work area. In many instances, a motor on the movable carriage also propels the vehicle across the work area. A specific example utilized herein in depicting and describing an embodiment of this invention is a grain stirring apparatus in which a stirring auger is supported on a frame which traverses over a storage bin. An electric motor on the traversing frame rotates the auger to stir grain in the bin. Another motor on the frame supplies power for driving the support mechanism and thus the auger in their traversing movements. However, it will be appreciated that the cable take-up arrangement of this invention is suited to any application wherein an electrical motor is to be traversed across a work area while being supplied with power from a fixed power supply source, e.g., other stirring or aerating mechanisms, reciprocating conveyor vehicles, electrically-powered cranes, and the like.

In traversing installations of the type indicated, one manner of supplying electrical power to the movable carriage is by positioning exposed conductors along the traversing path, with sliding contactors on the carriage unit. However, the exposed conductors and contactors represent an undesirable and unacceptable hazard in many applications. Insulated power supply conductors with a fixed or permanent connection on the carriage are preferable from a safety standpoint, and are required in many situations. However, such insulated condutors must be of a length to extend from a fixed power supply point to all positions of the traversing mechanism. This results in a problem of taking up or storing the excess length of power cable when the carriage is in various positions, to avoid tangling of the cable on itself or with the work mechanism or with adjacent structure. This invention pertains to improved take-up apparatus for such applications.

It is an object of this invention to provide an improved storage and take-up arrangement for a power cable on a movable power unit.

It is another object of this invention to provide a simple, reliable and inexpensive apparatus for providing a variable length of available power supply cable to a traversing power apparatus.

It is a further object of this invention to provide improved apparatus of the aforementioned type which automatically supplies the necessary length of power cable for any given position of the power unit, while also providing automatic take-up and avoiding the occurrence of undue slack in said cable as the power unit traverses a given path.

Further and additional objects and advantages of this invention will appear from the description, accompanying drawings and the attached claims.

In carrying out this invention in one illustrative form, a rotatable idler take-up reel is mounted on a power unit which is movable back and forth along a predetermined path between two end positions. A flexible power supply cable member has one end anchored adjacent one end of the path of the unit and extends to the reel and around the reel in one direction to an end which is fixed relative to the reel. This end of the power cable is approximately connected to a motor on the power unit. Another flexible member has one end anchored adjacent the other end of the path of the unit and extends to and around the reel, with this member passing around the reel in a direction opposite to the winding of the power cable. Both the power cable and the other flexible member are of a length to span the traversing path of the power unit. As the power unit is moved in either direction along its path, one of the flexible members will be placed in tension which will result in rotating of the reel to pay out that member. The resulting rotational movement of the reel will simultaneously take up the other of the members to avoid occurrence of undesired slack in the member toward which the power unit is moving.

For a more complete understanding of this invention, reference should now be had to the embodiments illustrated in greater detail in the accompanying drawings and described below by way of examples of the invention.

IN THE DRAWINGS

FIG. 1 is a side view of apparatus employing teachings of this invention;

FIG. 2 is an elevation view of the apparatus of FIG. 1 taken along line 2—2 of FIG. 1 and looking in the direction of the arrows;

FIG. 3 is an enlarged top view of the reel and parts of the flexible members of the apparatus of FIG. 1; and FIG. 4 is a schematic illustration of a reeling arrangement of another embodiment employing teachings of this invention.

Referring now to the drawings, and more particularly to FIGS. 1–3, the invention is illustrated as applied to apparatus for stirring grain in a grain bin. In this arrangement, a traversing carriage unit 10 is supported on flanges or rails 12 extending along the upper edges of the side walls 14 of a bin identified generally at 16. The carriage 10 includes a rotatable transverse support shaft 20 having flanged wheels 22 at its opposite ends, with these wheels engaging the upright flanges of the rails 12. The wheels 22 grip these upright flanges to propel the carriage unit 10 back and forth across the bin, parallel to the rails 12, as the shaft 20 is rotated. The shaft 20 is of substantial diameter and supports a stirring assembly 24. The assembly 24 includes, generally, a frame unit 26, a vertical stirring auger 28 and an electrical drive motor 30, for instance as disclosed and described in my U.S. Pat. No. 3,584,842. The frame unit 24 engages the shaft 20 in a manner to move longitudinally of the shaft 20 (across the width of the bin 16) as the shaft 20 rotates in moving the entire carriage unit 10 longitudinally of the bin, parallel to the rails 12. An appropriate mechanism is provided to periodically reverse the direction of movement of the assembly 24 axially of shaft 20, for instance a pair of discs 32 and cooperative mechanism (not shown) on the frame unit 26, as shown and described in greater detail in my aforementioned U.S. Pat. No. 3,584,842.

The carriage assembly 10 includes a frame assembly 34 comprising an upright frame unit 36 and a stabilizing or outrigger bar 38. The frame 34 is mounted on the shaft 20 as by a suitable bearing block assembly at 40.

Flanged wheels 42 at the outer ends of the bar 38 engage the subjacent rail 12 and stabilize the carriage unit 10 against tipping about the axis of the shaft 20. A gear motor unit 44 is supported on the frame upright 36, and a roller chain 46 engages the output sprocket 48 of the gear motor 44 as well as a sprocket 50 affixed to shaft 20 for propelling the carriage unit 10 along the rails 12. The motor unit 44 may be reversible to selectively effect movement of the carriage unit in either direction along rails 12. To this end, a reversing switch may be controlled by any suitable mechanism such as a sliding rod 52 supported on the frame 34 to engage and be operated by stop bars 54 and 56 at opposite ends of the bin.

A reel 60 is journaled upon an axle 62 mounted on the upper end of the frame unit 34 and extending normal to the traversing path of unit 10. The reel 60 includes a right circular cylindrical drum 64 with end flanges 66 and 68, and an intermediate flange 70 which divides the reel 60 into two sections of equal diameter.

A flexible insulated electric power supply cable 72 is connected to a suitable remote power source (not shown). The cable 72 is anchored at one end of the bin 16, as at clamp 74, and extends from that point to and through the guide 76 on the carriage and to and around the reel 60, e.g., in a clockwise direction as seen in FIG. 1. The end of this cable is fixed relative to the reel 60. Suitable means are provided, such as commutator rings and brushes (not shown) for electrically connecting this cable at its inner end to an appropriate conductor or conductors leading to the motors 30 and 44. One suitable connector apparatus is described in my U.S. Pat. No. 3,550,061. A fixed conductor cable 78 is shown extending through a positioning guide 80 and to the motor 30, with sufficient slack length to accommodate the traversing movement of the assembly 24 across the width of the bin, axially of the shaft 20. To minimize the variation in distance which cable 78 must span, the outer end of guide 80, through which the cable 82 passes, is positioned approximately in a mid plane of the bin 16.

A flexible rewind drive cable 86 has one end affixed at the opposite end of the bin 16, as by a clamp 88, and extends to and around the drum of reel 60. The cable 86 circumscribes drum 64 in a direction opposite to cable 72, i.e., in a counterclockwise direction as seen in FIG. 1; see also FIG. 3. The opposite or inner end of cable 86 is affixed to the drum 64.

It will be appreciated that the cable attachments 74 and 88 are adjacent the opposite end of the path of movement of carriage 10 as the carriage traverses the bin 16. Each of the cables 72 and 86 is of sufficient length to extend from the respective securement 74 and 88 to any position which the reel 60 may assume in the normal reciprocating movement of the carriage assembly 10 along its path. More particularly, each of these cables has a free length inward of the respective securemenet at 74 or 88 somewhat greater than the span of movement of the carriage 10 plus the length required to reach from the securement to the respective adjacent end position of the reel 60, note cable 72 in FIG. 1. These two cables are initially installed so that each leads directly from the respective attachment 74 or 88 to the guide 76 and reel 60 without sag or slack, and the excess length at the reel end of each cable is passed about the reel drum 64 in opposite directions as described above. It will be appreciated that the reel 60 idles on shaft 62 and is driven only by the cables 74 and 88.

In operation, as the carriage unit traverses its work path, movement of the carriage away from one end position will place a slight tension on the cable away from which the carriage is moving. This will cause rotation of the reel 60 to pay out that cable. The same rotary motion of the reel will simultaneously reel in or take up the cable toward which the carriage is moving, to preclude occurrence of slack and drooping or tangling of that cable in the operating mechanism. Since the two sections of the drum 64 are of equal diameter, the length of cable being reeled in will closely approximate the length of the cable being unwound, and since both of these lengths are directly related to the displacement of the carriage unit occurrence of excess slack in either cable will be prevented. By way of a more specific example, as the carriage unit 10 moves to the right from the position shown in FIG. 1, the power cable 72 will be placed under slight tension, which will cause unreeling or paying out of that cable and thus counterclockwise rotation of the reel 60 as seen in FIG. 1. This rotation of the reel 60 will automatically take up cable 86 as the carriage moves towards its end position adjacent attachment 88. Conversely, as the carriage is subsequently moved toward attachment 74, the induced unreeling of cable 86 will rotate the reel 60 in an opposite direction to take up the power cable 72.

In the embodiment illustrated diagrammatically in FIG. 4, it is assumed that the reel 160 is mounted on a traversing mechanism in the same manner as described above with respect to reel 60. A power supply cable 172 is anchored adjacent one end of the reciprocating path of the mechanism on which reel 160 is mounted, as at 174, and extends about and is secured to the reel 160 in the same manner as described above with respect to cable 72. A rewind cable 186 is secured adjacent the opposite end of movement of the apparatus as at 188 and extends to and around the reel 160 in a direction opposite the winding of cable 172 thereon, in the same manner as described above with respect to cable 86. In this embodiment, cable 186 is continuous through several turns at **186*a* on the reel 160 and extends therefrom generally parallel to cable 172, as indicated by section 186*b*, to a point of attachment at 190 which is adjacent the attachment 174. In this arrangement, a somewhat greater length of cable 186 is required. However, all tensile forces for rotating the reel in either direction may be provided by the tension cable 186, and a slightly slackened condition may be maintained in cable 172 at all times, thereby precluding application of tensile forces to the power cable 172 other than as necessary to support the weight of cable 172** itself.

In each of the illustrated embodiments the power cables typically will be electrical conductors with appropriate insulating coverings, whereas the tension cables 86 and 186 may be more suitable for accommodating tensile forces, such as comprising light steel cables, wires or other appropriate flexible tensile members. The power cable may include tensile reinforcing if desired.

It will be seen that improvements have been provided which meet the aforestated objects of the invention.

While particular embodiments of this invention are shown and described herein, it will be understood, of course, that the invention is not to be limited thereto since many modifications may be made by those skilled in the art, particularly in light of the foregoing teachings. It is contemplated, therefore, by the appended claims to cover any such modifications as fall within the true spirit and scope of this invention.

What is claimed is:

1. Apparatus comprising a power unit which is movable back and forth along a predetermined path extending between first and second end positions; said power unit including a motor; a rotatable idler take-up reel supported on said power unit for movement therewith along said path; an elongated flexible power supply member having a first section secured adjacent said first end position, a second section fixed relative to said reel, and a further section between said first and second sections of a length to span said path, said further section extending directly from said first section to said power unit and in one direction around said reel to said second section; means on said power unit for connecting said second section of said power supply member and said motor; and a second elongated flexible member having a first section secured adjacent said second end position, and a further section of a length to span said path, said further section of said second member extending from said first section thereof directly to said power unit and in an opposite direction around said reel relative to said power supply member and being in drive engagement with said reel; whereby upon traversing movement of said power unit in either direction along said path, paying out of one of said flexible members from said reel will cause rotation of said reel and taking up of the other of said flexible members on said reel.

2. Apparatus as in claim 1 wherein said second flexible member includes a remote section secured adjacent said first end position, said further section of said second member extending from said first section thereof to and around said reel and thence to said secured remote section thereof.

3. Apparatus for stirring grain in a grain storage receptacle comprising a power unit as in claim 1 including depending stirring means in drive connection with said motor for stirring grain in said receptacle, and means for supporting said power unit for traversing movement across said receptacle.

4. Apparatus comprising a power unit which is movable back and forth along a predetermined path extending between first and second end positions; said power unit including a motor; a rotatable idler take-up reel supported on said power unit for movement therewith along said path; an elongated flexible power supply member having a first section secured adjacent said first end position, a second section fixed relative to said reel, and a further section between said first and second sections of a length to span said path, said further section extending directly from said first section to said power unit and in one direction around said reel to said second section; means on said power unit for connecting said second section of said power supply member and said motor; and a second elongated flexible member having a first section secured adjacent said second end position, a second section fixed relative to said reel, and a further section between said first and second sections thereof of a length to span said path, said further section thereof extending from said first section to said fixed second section on said reel and in an opposite direction around said reel relative to said power supply member; the portion of each of said further sections which exceeds the span from the reel to the respective first section thereof being stored on said reel in any given position of said power unit along said path; whereby upon traversing movement of said power unit along said path toward either of said end positions, paying out of the respective flexible member extending to the opposite end position will cause rotation of said reel for taking up the flexible member extending to the end position toward which said power unit is moved.

* * * * *

UNITED STATES PATENT OFFICE

CERTIFICATE OF CORRECTION

PATENT NO. : 3,937,308

DATED : February 10, 1976

INVENTOR(S) : Eugene G. Sukup

It is certified that error appears in the above-identified patent and that said Letters Patent are hereby corrected as shown below:

Column 1, line 12, "forming" should read -- performing --. Column 2, line 6, "approximately" should read -- appropriately --. Column 3, line 59, "securemenet" should read -- securement --. Column 6, line 30, "the reel" should read -- said reel --.

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*